United States Patent [19]
Torres, Jr.

[11] 3,742,621
[45] July 3, 1973

[54] STUDENT RESPONSE RECORDING SYSTEM
[75] Inventor: John B. Torres, Jr., Conklin, N.Y.
[73] Assignee: The Singer Company, Binghamton, N.Y.
[22] Filed: Jan. 17, 1972
[21] Appl. No.: 218,387

[52] U.S. Cl. ................................ 35/48 R, 346/76
[51] Int. Cl. ........................................ G09b 5/00
[58] Field of Search ....................... 35/9 R, 48 R; 346/76

[56] References Cited
UNITED STATES PATENTS
| | | | |
|---|---|---|---|
| 3,161,457 | 12/1964 | Schroeder et al. | 346/76 |
| 3,163,489 | 12/1964 | Borne et al. | 346/76 |
| 3,327,312 | 6/1967 | Hamilton et al. | 346/76 X |
| 3,245,157 | 4/1966 | Laviana | 35/9 R |
| 3,300,876 | 1/1967 | Johannsen | 35/9 B |
| 3,633,289 | 1/1972 | Hannah | 35/48 |

Primary Examiner—Wm. H. Grieb
Attorney—Francis L. Masselle

[57] ABSTRACT

An improved printer for recording student responses at an instructor's station in an educational teaching and testing apparatus of the type wherein students are provided with individual responder units with which they may respond to questions presented by an instructor is shown. Carbon film resistors are operated for short periods in an overrated condition to record marks indicating correct and incorrect responses on thermal paper held in contact with the resistors by a gravity pressure plate. Each student has two resistors assigned which are in a series circuit with oppositely biased SCR's. A correct answer causes a voltage of one polarity and an incorrect answer that of an opposite polarity to be output from the responder to turn on one or the other SCR. The voltage across the SCRs is kept at a low level during the response time and then raised to accomplish printing after which it is interrupted to turn off the SCRs in preparation for a new response.

7 Claims, 4 Drawing Figures

STUDENT RESPONSE RECORDING SYSTEM

This invention relates to teaching and testing educational apparatus in general and more particularly to an improved thermal printer for recording student responses in such apparatus.

Educational testing devices in which students are presented with a question and must respond via an individual responder device are well known in the art as exemplified by U.S. Pat. Nos. 3,300,876 and 3,245,157.

It is generally desirable to make a record of the responses made by the student for further analysis by the teacher. One method of recording which has been applied in the prior art is the use of heat sensitive paper and light bulbs. A roll of paper is ruled to form pairs of rows each pair associated with a student, one row of the pair for designating correct and one for designating incorrect answers. Each student will also have a pair of heating lamps activated by his responder and located adjacent his rows on the heat sensitive paper. As he responds, the heat from one of the lamps will make a mark on the paper indicating whether he answered correctly or incorrrectly. The lamps used have a relatively short life and high cost making operation expensive.

The present invention substitutes for the lamps inexpensive carbon film resistors which are caused to dissipate about 6 times their rated power for a short period of 10 – 14 seconds during printing. The short duty cycle makes it possible to operate in this mode without damage to the resistors which should last indefinitely. Additional efficiency is obtained by pressing the paper against the resistors with a contact pressure plate during printing.

It is the principle object of this invention to provide an improved recorder for use in educational testing apparatus which is lower in cost and requires less maintenance than comparable prior art recorders.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention reference should be had to the following detailed description taken in connection with the accompanying drawing, in which.

Figure 1:
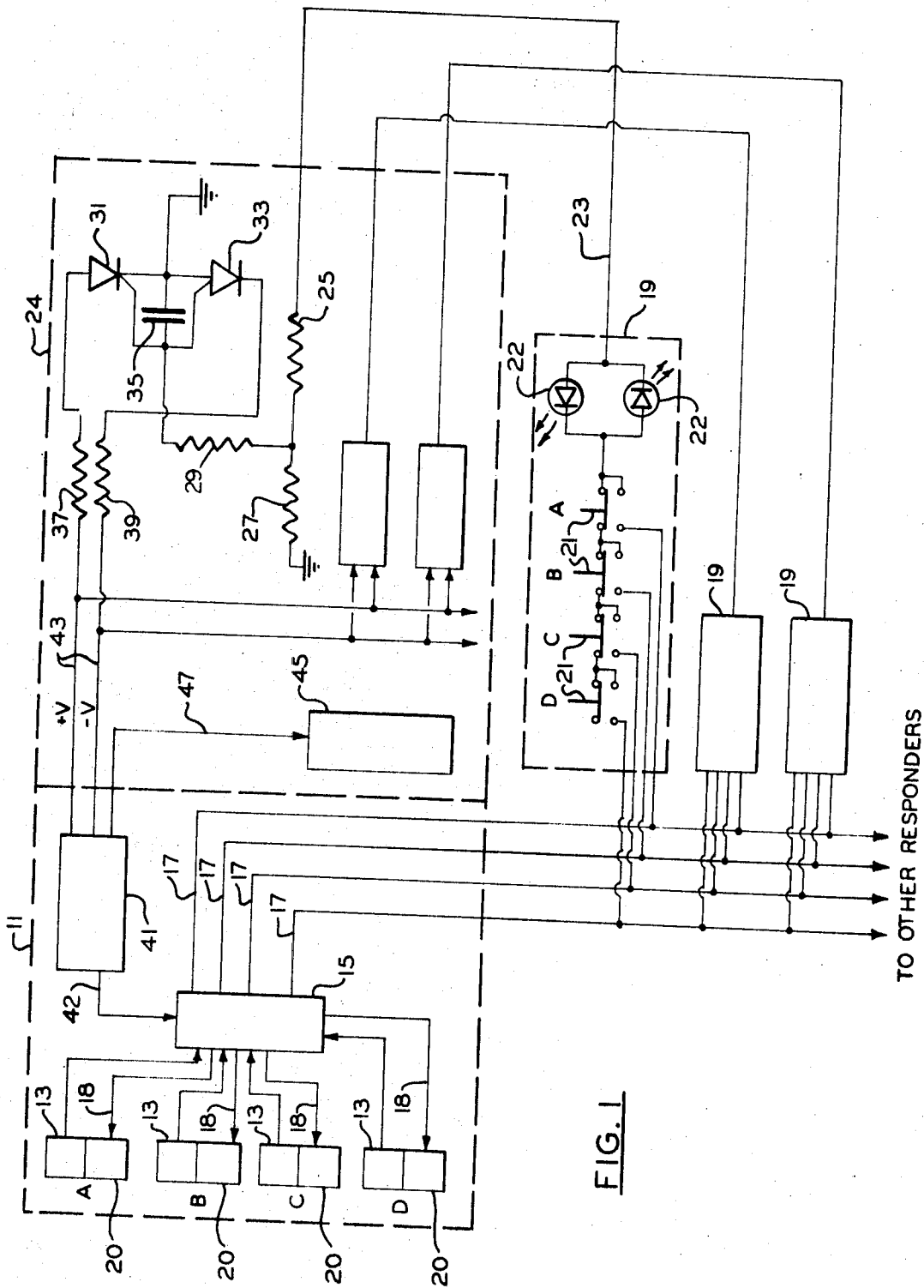
FIG. 1 is a schematic-block diagram of the circuits of the present invention.

The basic elements of the response and recording system are shown on FIG. 1. At an instructor's station 11 are four switches 13 labeled A through D any one of which the instructor may select as a correct answer. The switch outputs are provided to block 15 which provides four corresponding outputs on lines 17 which will be positive for the selected answer and negative for all other letters.

Also provided is a feedback on lines 18 to light associated lamps 20 for the selected switch 13. The types of devices which may be used in block 15 are well known in the art. For example switches 13 may be momentary switches used to set latching relays having a common contact connected to one of output lines 17, a normally closed contact connected to a negative voltage and a normally open contact to a positive voltage. At the end of a question cycle the voltage may be removed to unlatch the relays. Likewise flip flops and other solid state devices may be used.

The outputs on lines 17 are provided to a plurality of responders 19 only one of which is shown in detail on FIG. 1. Each output is an input to one normally open contact of a push button switch 21 correspondingly labeled A through D. The normally closed contacts of these switches and the other normally open contact are wired in series so that operation of any switch 21 will cause the output appearing on its input line 17 to reach responder output line 23. If the student has selected the same letter as the instructor a positive voltage will appear on line 23. Otherwise the voltage on that line will be negative. To give the student an indication whether he has answered correctly, two paralleled light emitting diodes (LEDs) 22 are placed in series in line 23. Depending on the polarity of the selected answer a corresponding LED will light when the student answers.

The voltage on line 23 is provided to the printing unit 24 where it is connected to a resistor 25 in series with a resistor 27 to ground. The two resistors 25 and 27 form a voltage divider. The voltage from the junction of resistors 25 and 27 is taken through a resistor 29 to the gates of two Silicon Controlled Retifiers (SCRS) 31 and 33. A capacitor 35 is provided from resistor 29 to ground to provide noise rejection.

A positive voltage on line 23 will gate on SCR 31 which has its anode tied through a carbon film resistor 37 to a positive voltage and its cathode to ground. Likewise a negative voltage on line 23 will gate on SCR 33 having its cathode tied to a negative voltage through a carbon film resistor 39 and its anode to ground.

Carbon film resistors 37 and 39 are the resistors which provide the heat to mark the paper. For example if V is 24 volts and resistors 37 and 39 are each 384 ohm, ¼ watt resistors, a current of about 0.0625 amp. results and power dissipation of 0.0039 × 384 or 1.5 watts which is 6 times rated power will be dissipated.

Control logic block 41 controls the answer and printing cycles. At the beginning of a response period a command on line 42 will reset block 15 so that all outputs on lines 17 are negative and none of lamps 20 illuminated. The voltage on lines 43 at this point will be at or near zero volts. The instructor will select a proper answer and give the students a question. At this point the voltage on lines 43 will be increased to a low voltage, e. g., 6 volts. When a student responds, the proper SCR 31 or 33 will be latched on by the small voltage on lines 43. However, with 6 volts and 384 Ohms as described above, less than .1 watt will be dissipated and resistors 37 and 39 will not heat up. At the end of the response period, the voltage on lines 43 under control of logic block 41 is boosted to 24 volts for a period of about 10 seconds to cause a mark to be made on the thermal paper contacting the resistors. At the end of this print cycle the voltage on lines 43 is reduced to approximately zero volts to turn of the SCR and the printer device 45 is commanded to advance by a signal on line 47.

The logic block 41 and the printer drive 45 may be constructed in any of many ways well known in the art and since they do not form part of the present invention will not be further described herein.

Figure 2:
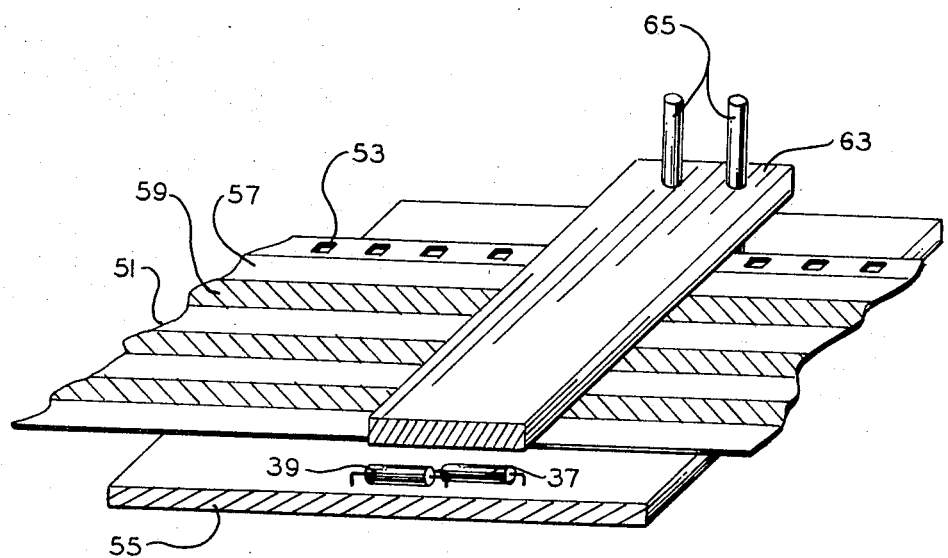
FIG. 2 is a perspective view partially in section of a preferred mechanical arrangement of the resistors, thermal paper and pressure plate of the present invention.
Figure 3:
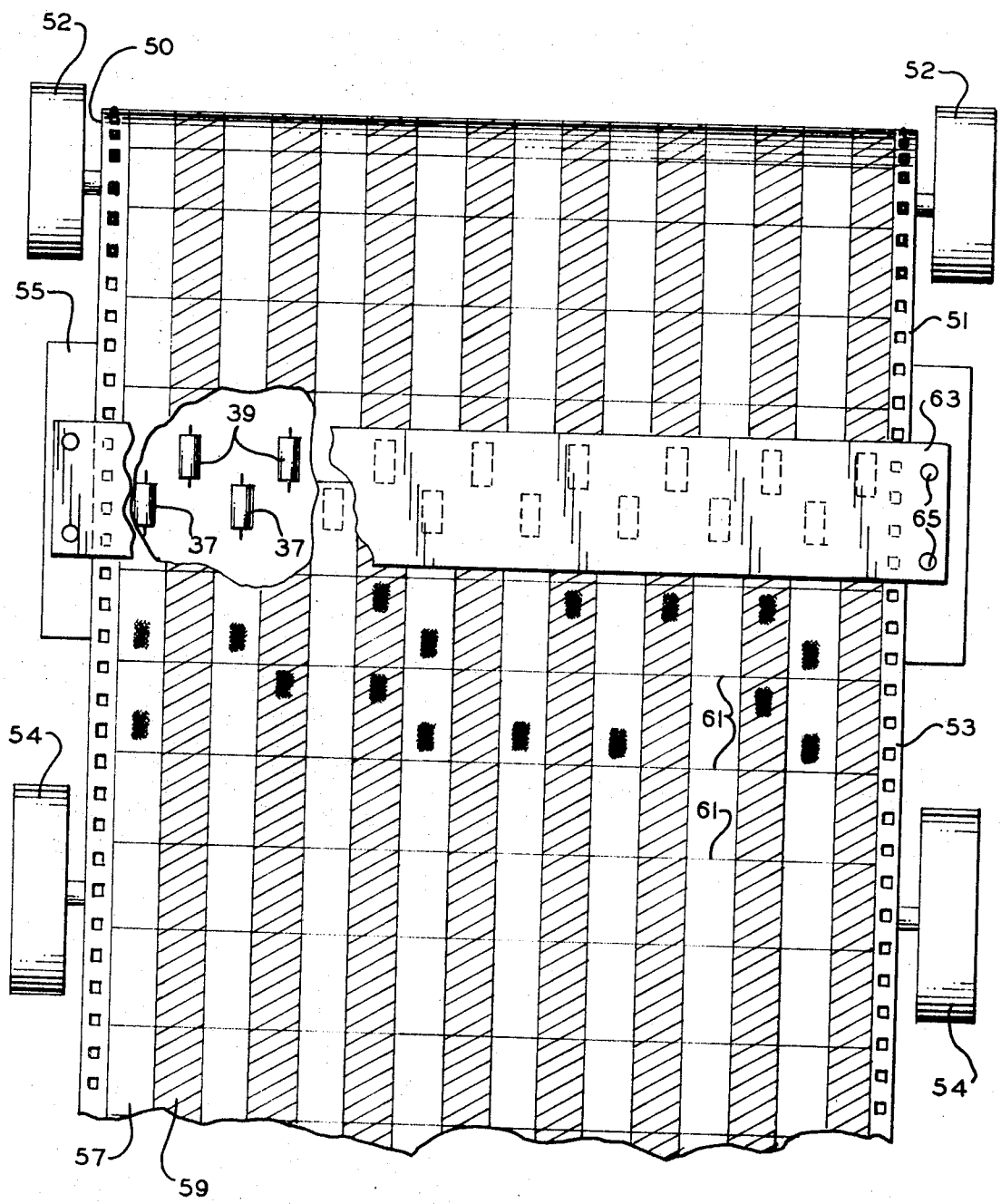
FIG. 3 is a plan view of the preferred mechanical embodiment.

The mechanical arrangement of the preferred embodiment of the thermal printer is shown in FIG. 2 and 3. As appears in FIG. 3, a roll 50 of thermal paper 51 is supported in conventional fashion by supports 52. The paper contains perforations 53 by which a conventional sprocket or finger mechanism 54 may engage the paper to advance it. Located beneath paper 51 is a printed circuit board 55 (FIG. 2) on which are mounted a plurality of carbon film resistors 37 and 39, one of each for each student responder.

Referring to FIG. 2, resistors 37 and 39 are aligned with columns on the paper 51. Two columns are assigned to each student, a white column 57 for correct answers and a shaded column 59 for incorrect answers. Resistors 37 and 39 are offset for heat isolation and to allow the number of right and wrong answers to a given question to be easily determined. Transverse lines 61 (FIG. 3) may be placed on the paper to delineate rows of questions.

A pressure plate 63 rests freely on the paper 51 at the point where the resistors are located to hold the paper against the resistors to insure better heat transfer. Plate 63 is restrained from moving in a horizontal plane by vertical pins 65 which pass freely through suitable apertures in the ends of the plate permitting it to move vertically so that gravity alone holds the plate against the paper.

Figure 4:
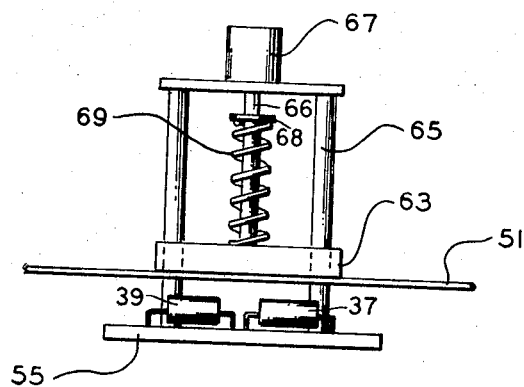
FIG. 4 is an elevational view of an optional pressure device.

An modification for increasing heat transfer is shown on FIG. 4, wherein solenoid are secured (one shown at 67) pins 65 on each side of pressure plate 63.

The armature or plunger 66 of each solenoid 67 extends vertically downward toward, and terminates short of, the upper surface of pressure plate 63. A coil spring 69 is coaxially disposed about plunger 66 with its lower end in contact with plate 63 and its upper end bearing against a suitable spring abutment member 68 secured to plunger 66. During printing the solenoids at both ends of plate 63 are simultaneously energized whereby each plunger 66 moves downwardly (as shown in FIG. 4) to compress spring 69 which causes plate 63 to apply additional pressure on paper 51. During paper movement solenoids 67 are de-energized to avoid unnecessary drag on the paper.

Thus an improved apparatus for recording student responses in which low cost carbon resistors are used as heating elements has been shown. It will be obvious to those skilled in the art that various modifications may be made to the disclosed embodiment without departing from the spirit of the invention which is intended to be limited solely by the appended claims.

What is claimed is:

1. A student response recording system comprising:
  a. heat sensitive paper divided in sections by permanent marks thereon;
  b. means to support said paper;
  c. a plurality of carbon film resistors placed adjacent to and on one side of said paper said plurality being equal to the number of responses to be recorded and each of said resistors being aligned with one of said sections;
  d. means to hold said paper in contact with said resistors;
  e. student responder means having a plurality of switches which may be operated to select one of an equal plurality of multiple choice answers, said responder means having an input indicative of a correct answer and providing a voltage output of a first polarity if a correct answer is selected and of an opposite polarity if an incorrect answer is selected, said two polarities being considered as two separate responses and each having one of said resistors associated therewith; and
  f. a plurality of means, responsive to said student responder means, equal in number to said plurality of resistors to apply to said resistors for a predetermined time, a voltage which will cause a power dissipation which is substantially in excess of the rating of said resistors.

2. The invention according to claim 1 and further including means to advance said paper between said print periods.

3. The invention according to claim 1 wherein said means to hold comprises a plate supported by vertical rods and free to move vertically thereon whereby the weight of the plate holds said paper in contact with said resistors.

4. The invention according to claim 3 and further including means to apply additional pressure to said plate during printing only.

5. The invention according to claim 1 wherein said means to apply voltage comprise:
  a. a plurality of silicon controlled rectifiers, one in series with each of said resistors and arranged in pairs, one of each pair being biased to be turned on by a voltage of said first and the other by a voltage of said opposite polarity, the gates of each of said pairs being connected to the output of one of said responders;
  b. means to apply a voltage across said series resistors and silicon controlled rectifiers; and
  c. means to control the level of said voltage such that for a period during which responses are permitted it will be at a first level which will not cause said resistors to exceed their rating, for a period during which it is desired to print responses it will be at a second level which will cause said resistors to dissipate power substantially in excess of the rating of said resistors and after a predetermined period at said second level it will go to substantially zero for at least long enough for said silicon controlled rectifiers to turn off.

6. The invention according to claim 1 wherein said switches are momentary-contact single-pole, double-throw switches arranged in series with the common terminal of each switch tied to the normally closed contact of the next switch, the common terminal of the last switch providing the responder output and further including instructor-controlled answer-selection means providing a plurality of outputs equal in number and corresponding to said plurality of switches, said outputs being connected to the normally open contact of the corresponding switch, said answer-selection means providing a voltage of said first polarity on the output line corresponding to the correct answer and a voltage of said opposite polarity on all other lines.

7. The invention according to claim 6 and further including a pair light emitting diodes connect in parallel with the anode of the one connected to the cathode of the other, said parallel diodes being connected in series with said responder output, whereby a correct answer will light one and an incorrect answer the other of said diodes.

* * * * *

UNITED STATES PATENT OFFICE
CERTIFICATE OF CORRECTION

Patent No. 3,742,621    Dated July 3, 1973

Inventor(s) John B. Torres, Jr.

It is certified that error appears in the above-identified patent and that said Letters Patent are hereby corrected as shown below:

Column 3, line 35, change "solenoid" to --solenoids-- and delete "are secured"; and
line 36, after "67)", insert --are secured atop--.

Signed and sealed this 9th day of July 1974.

(SEAL)
Attest:

McCOY M. GIBSON, JR.
Attesting Officer

C. MARSHALL DANN
Commissioner of Patents